United States Patent [19]

Hauser

[11] Patent Number: 5,235,899
[45] Date of Patent: Aug. 17, 1993

[54] SELF-CONTAINED ENVELOPE FOR VEHICULAR TRANSMISSION SERVO CONTROL UNIT

[75] Inventor: Kenneth C. Hauser, Canton, Mich.

[73] Assignee: General Motors Corporation, Detroit, Mich.

[21] Appl. No.: 844,081

[22] Filed: Mar. 2, 1992

[51] Int. Cl.$^5$ ............................................. F01B 31/00
[52] U.S. Cl. ..................................... 92/110; 92/171.1; 92/181 R; 475/146; 188/77 R
[58] Field of Search ....................... 92/51, 52, 59, 109, 92/110, 129, 150, 151, 152, 146, 161, 171.1, 181 R; 475/146; 192/12 C; 188/77 R

[56] References Cited

U.S. PATENT DOCUMENTS

| | | | |
|---|---|---|---|
| 4,628,795 | 12/1986 | Pickard et al. | 74/869 |
| 4,838,126 | 6/1989 | Wilfinger et al. | 92/109 |
| 4,881,453 | 11/1989 | Armstrong | 92/84 |

Primary Examiner—Edward K. Look
Assistant Examiner—F. Daniel Lopez
Attorney, Agent, or Firm—Donald F. Scherer

[57] ABSTRACT

This invention is directed to a new and novel envelope for housing a servo mechanism adapted to control a brake assembly used in conjunction with a vehicular transmission. The envelope is adapted to be demountably received within a receptacle provided in the transmission case. A pilot bore penetrates the transmission case and is located axially of the receptacle. The envelope incorporates a base portion, a cap portion and a coupler portion. A servo-apply pin extends outwardly through the coupler portion of the envelope to be reciprocatingly received within the pilot bore. A piston chamber is provided interiorly of the base and cap portions. An actuating piston is operatively received in the piston chamber, and means are included to effect communication of hydraulic pressure from a conduit within the transmission case, through the coupler portion of the envelope and the servo-apply pin into the piston chamber. Locking means are also provided selectively to secure the envelope to the transmission case.

2 Claims, 3 Drawing Sheets

SELF-CONTAINED ENVELOPE FOR VEHICULAR TRANSMISSION SERVO CONTROL UNIT

TECHNICAL FIELD

The present invention relates generally to planetary gear sets. More particularly, the present invention relates to an improved servo assembly for actuating a torque transfer device in the nature of a brake band of the type generally associated with the control of planetary gear sets. Specifically, the present invention relates to the use of a self-contained envelope within which to house a servo-apply mechanism, the envelope permitting more convenient and economical assembly and/or replacement of the servo assembly.

BACKGROUND OF THE INVENTION

Automatic transmissions may employ single or multiple planetary gear sets. Each planetary gear set has a central or sun gear; a ring or internal gear; and a carrier which supports a plurality of pinion or planet gears that are meshingly interposed between the sun and ring gears. Selective connection of one member of a planetary gear set with another member to effect simultaneous rotation of those members and/or selective connection of one or more members of a planetary gear set with nonrotatable structure, such as the transmission housing or case, to preclude rotation of that member, determines the drive ratio provided by the transmission. Torque transfer devices which effect a connection between two rotating members of a planetary gear set are generically designated as clutches, and torque transfer devices which effect a connection between a rotating member of a planetary gear set and a nonrotatable member such as the transmission case are generically designated as brakes.

Torque transfer brakes have historically employed brake bands selectively to retard, stop and/or preclude the rotation of one or more of the rotatable planetary gear members in a vehicular transmission. A transmission brake band typically circumscribes the cylindrical reaction surface on the periphery of a drum member presented from at least one of the rotatable components in a planetary gear set. One end of the band is fixedly anchored, as to the transmission case, and the other end of the brake band presents an input assembly which interacts with a linearly displaceable servo-apply pin that actuates the brake band by displacing the input assembly in a manner that either constricts or expands the circumferential diameter of the brake band in order, respectively, for the brake band frictionally to grip or release the cylindrical reaction surface of the drum member.

The servo mechanism employed to operate each brake band generally incorporates a hydraulically operated piston assembly. Historically, the manufacture of the transmission case within which the planetary gear set was to be housed was further complicated because the transmission case required a boss, the interior of which was accurately machined to receive the servo mechanism. For example, the boss was machined to provide the necessary piston chamber within which an actuating piston assembly could reciprocate to effect axial translation of a servo-apply pin, and thereby operate the brake band assembly.

Transmission cases have rather universally been, and continue to be, metallic castings. Castings do, on occasion, incorporate voids, but even microscopic voids, which are generally considered as merely contributing to the porosity of the casting, can require additional labor to prevent leakage paths through the casing.

As should be readily apparent, the structural properties of strength and hardness required to make an acceptable transmission case are not necessarily conducive to providing a readily machinable casting. In fact, variations in the sectional thickness of a casting, and particularly a casting having the complexity of a transmission case, can cause localized hard or soft spots. Although one might ideally desire a more homogenous casting, such localized variations in the physical properties of the casting may not themselves negate the suitability of the casting to serve as a transmission case. Unfortunately, however, such localized variations can adversely affect the ability of the casting to be acceptably machined.

For example, the reaction of a machine tool against a localized hard spot can cause microscopic, if not macroscopic, grooves which could well preclude the effective sealing of the pressure chamber required for the piston assembly in a servo mechanism built into the transmission case, and such flaws might not be identified until after at least partial assembly of the transmission. But even if any such flaws were detected at the earliest possible opportunity, the result could well be a rejected transmission case.

Hydraulically operated servo mechanisms for vehicular transmissions can be complex and relatively expensive to manufacture—particularly according to prior art methods whereby the servo mechanisms had to be linearly assembled within a cavity machined into a boss on the transmission case. Such historic assembly techniques are labor intensive and unduly contribute to the cost of the transmission.

SUMMARY OF THE INVENTION

It is, therefore, a primary object of the present invention to provide an improved transmission servo assembly that will permit a significant reduction in the complexity of the transmission case with which the servo assembly is to be employed.

It is another object of the present invention to provide an improved servo assembly, as above, that will permit a reduction in the machining operations required to prepare a transmission case for having the improved servo assembly operatively secured thereto and thereby reduce the scrap rate for cast transmission cases and concomitantly reduce the cycle time for the production of such transmission cases.

It is a further object of the present invention to provide an improved servo assembly, as above, that is self-contained in a novel and unique envelope.

It is a still further object of the present invention to provide a self-contained envelope for a servo assembly, as above, that can be demountably secured to a transmission case as a unit in order to facilitate assembly and/or replacement of the servo assembly, if necessary or desirable.

It is yet another object of the present invention to provide a self-contained envelope for a servo assembly, as above, that will reduce manufacture, replacement and maintenance costs.

It is an even further object of the present invention to provide a self-contained envelope for a servo assembly, as above, that can be manufactured by processes other than casting.

It is yet a further object of the present invention to provide an envelope for a servo assembly, as above, that may be hermetically sealed such that the introduction of foreign matter into the transmission is greatly reduced.

These and other objects of the invention, as well as the advantages thereof over existing and prior art forms, which will be apparent in view of the following detailed specification, are accomplished by means hereinafter described and claimed.

In general, a self-contained envelope for a transmission servo assembly embodying the concepts of the present invention fits into a receptacle in the transmission case. The receptacle includes a pilot bore and a coupling assembly that are axially aligned. A servo-apply pin extends outwardly from the envelope and is received within the pilot bore for axial reciprocation.

The servo-apply pin is connected to an actuating piston that is operatively received within the envelope. A piston chamber is also provided within the envelope for operative association with the piston. Hydraulic fluid—delivered by passage means which are included within the servo mechanism, and which communicate with a supply/discharge conduit within the transmission case through the interaction between a coupler portion of the envelope and a coupling chamber in the receptacle—effects selective pressurization and depressurization of the piston chamber.

One exemplary embodiment of a self-contained envelope for a transmission servo assembly embodying the concepts of the present invention, one variation thereof, as well as one alternative embodiment, are described in detail and are deemed sufficient to effect a full disclosure of the subject invention without attempting to show all of the various forms and modifications in which the invention might be embodied; the invention being measured by the appended claims and not by the details of the specification.

DESCRIPTION OF AN EXEMPLARY EMBODIMENT

Figure 1:
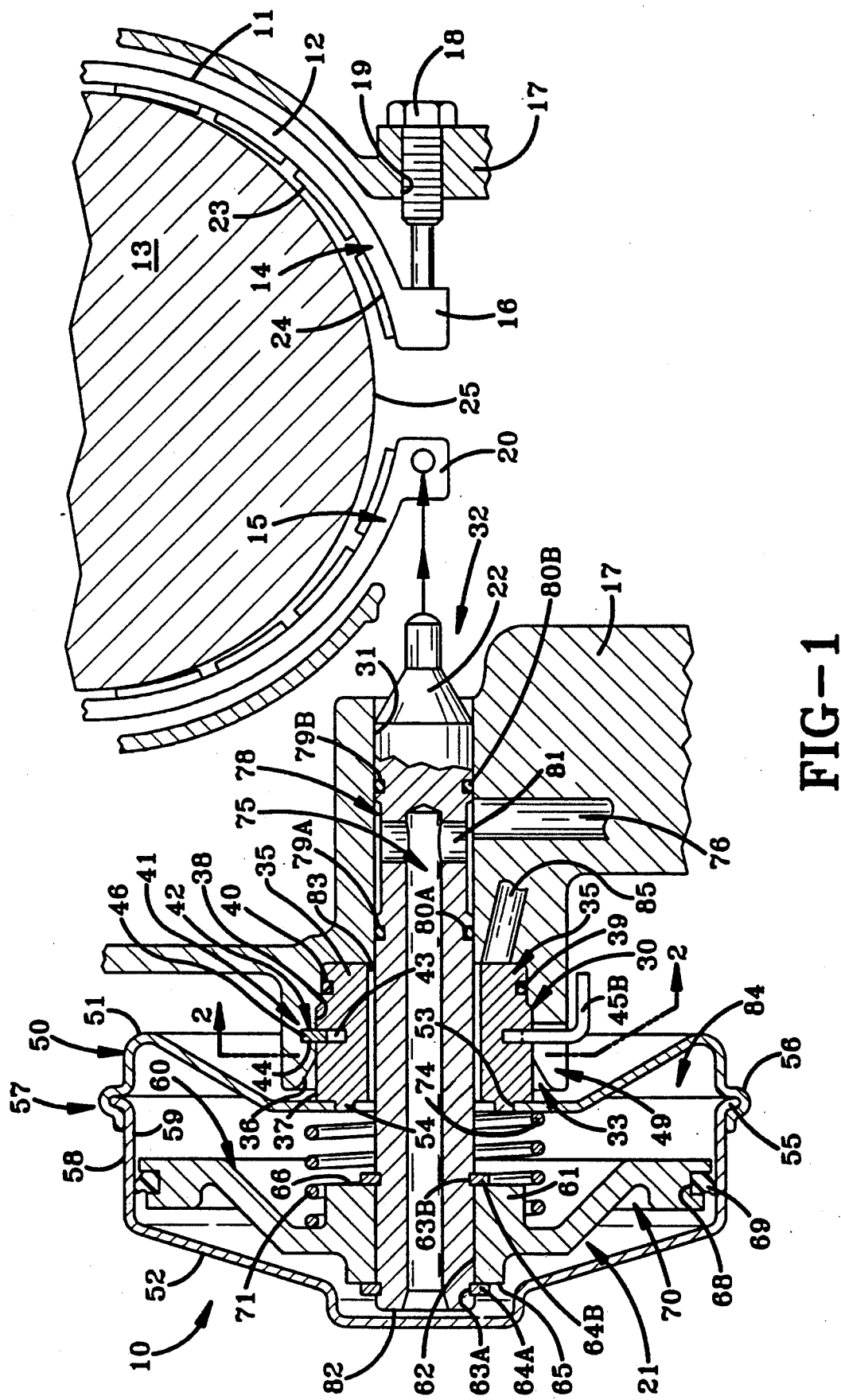
FIG. 1 is a cross-sectional view through a portion of a typical vehicular transmission depicting a servo mechanism housed within a self-contained envelope embodying the concepts of the present invention, the servo mechanism being schematically depicted as operatively interactive with a brake band assembly, depicted in side elevation, that substantially circumscribes a rotatable drum member that may be associated with a selectively rotatable component of the transmission.

One representative form of a self-contained envelope in which a servo mechanism may be housed, and which embodies the concepts of the present invention, is designated generally by the numeral 10 in FIG. 1. The representative envelope 10 is depicted in the environment of a vehicular transmission, and in particular, a transmission incorporating at least one planetary gear set. That is, a brake band assembly 11 having a backing strap 12 circumscribes an annular rotatable drum member 13 that may be presented from a ring gear, a carrier or even a sun gear in a planetary gear system, as is well known to the art, so that the details of a typical planetary gear system need not be depicted, or described, herein. Such planetary gear systems are described in U.S. Pat. No. 2,856,794 issued to Simpson on Oct. 21, 1958, or U.S. Pat. No. 4,223,569 issued to Koivunen et al. on Sep. 23, 1980.

As depicted in FIG. 1, the backing strap 12 incorporated in the representative brake band assembly 11 has first and second end portions 14 and 15. An anchor subassembly 16 may be connected to the first end portion 14 of the backing strap 12. The anchor subassembly 16 is, in turn, secured to the transmission case or housing 17, as by an adjusting set screw 18 which extends through a threaded aperture 19 in the transmission case 17 (the full remainder of which is not shown).

An input connector 20 may be connected to the second end portion 15 of the backing strap 12, and a servo-apply pin 22, which constitutes a portion of the servo mechanism 21 and which is presented from the envelope 10, interacts with the input connector 20 by means heretofore well known to the art. A friction lining 23, which is often a resin-coated paper pad, is secured, as by an epoxy, to that surface 24 of the backing strap 12 that is disposed in opposition to the cylindrical outer surface 25 of the rotatable drum member 13.

The rotatable drum member 13 is, of course, affixed to one of the rotatable components in a planetary gear set so as to rotate therewith. The frictional braking action applied by the brake band assembly 11 is controlled by actuation of the servo-apply pin 22 which receives input from a hydraulic or mechanical source in a well known manner. The application of the hydraulic force may, according to the concepts of the present invention, be applied within the envelope 10, as will be hereinafter more fully described.

Extension of the servo-apply pin 22 forces it against, and displaces the input connector 20 secured to the second end portion 15 of the backing strap 12. Displacement of the input connector 20 in response to extension of the servo-apply pin 22 tends, because the anchor subassembly 16 presented from the first end portion 14 of the backing strap 12 is secured to the transmission case 17, to constrict the diameter of the backing strap 12 about the peripherally outer cylindrical reaction surface 25 on the rotatable drum member 13 to impart a frictional engaging force therebetween. Conversely, retraction of the servo-apply pin 22 allows the backing strap 12 to expand relative to the peripheral reaction surface 25 on the rotatable member 13, thereby releasing the frictional engaging force between the backing strap 12 and the drum member 13.

The envelope 10, as may be seen in FIG. 1, is demountably secured in a receptacle 30 that is formed with the case 17 of a vehicular transmission and need only be machined to a modest extent to receive the envelope 10. One suitable configuration for the receptacle 30 is depicted in FIG. 1. Receptacle 30 includes a pilot bore 31 that is located axially of the receptacle 30. The pilot bore 31 penetrates the transmission case 17 such that one end of the pilot bore 31 opens into a plenum cavity 32 located interiorly of the case 17. The other end of the pilot bore 31 opens into a coupling chamber 33. The pilot bore 31, the coupling chamber 33—and the hereinafter described structure thereof—constitute the receptacle 30. As will be hereinafter more fully described, a portion of the envelope 10, and the servo-apply pin 22 extending outwardly from the envelope 10, cooperatively interact with the receptacle 30.

With continued reference to FIG. 1 it can be seen that the cylindrical coupler portion 35 of the envelope 10 is insertably receivable within the coupling chamber 33, and as depicted, the mouth portion 36 of the coupling chamber 33 may be flared axially outwardly to facilitate insertion of the coupler portion 35. Once the coupler portion 35 of this embodiment has been insertably received within the coupling chamber 33, the exterior surface 37 of the coupler portion 35 is preferably disposed in contiguous juxtaposition with the interior surface 38 of the coupling chamber 33. In fact, the mating surfaces 37 and 38 may be stepped, as shown and if desired, which contributes even further to a more facile insertion of the coupler portion 35 into the coupling chamber 33 during assembly.

In any event, the coupler portion 35 is sealed within the coupling chamber 33, as by the O-ring 39 that is received within the annular groove 40 in the exterior surface 37 of the coupler portion 35 to engage the interior surface 38 of the coupling chamber 33. In this embodiment the interior surface 38 is preferably machined to accept the coupler portion 35 and permit the hermetical seal that is accomplished by the O-ring 39.

Figure 2:
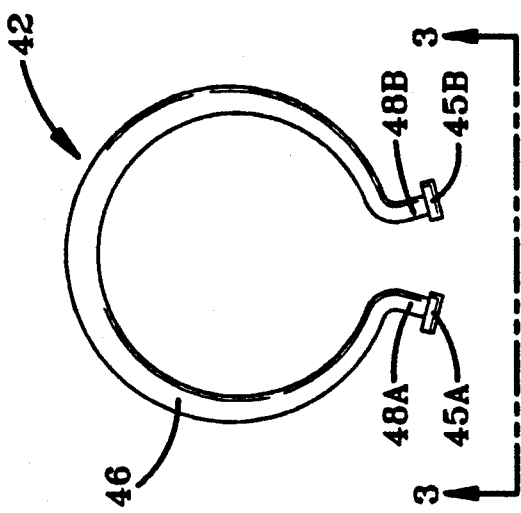
FIG. 2 is a transverse section taken substantially along line 2—2 of FIG. 1 to depict one exemplary embodiment of the locking arrangement by which the envelope is releasably secured to a receptacle in the transmission case.

A locking mechanism 41 is cooperatively interactive between the coupler portion 35 and the receptacle 30 releasable to secure the coupler portion 35 within the coupling chamber 33. As is best seen in FIGS. 1 and 2, a snap ring 42 may be mounted within a retention groove 43 that is recessed into the exterior surface 37 of the coupler portion 35. When the coupler portion 35 is seated within the coupling chamber 33, a locking groove 44 recessed into the interior surface 38 of the coupling chamber 33 is disposed in opposition to the retention groove 43 in the coupler portion 35 so that it may be lockingly engaged by the snap ring 42.

As is best seen in FIG. 2, the interior diameter of the retention groove 43 is selected in relation to the inner diameter of the snap ring body portion 46, such that when the snap ring is constricted—as when one compresses the end tabs 45A and 45B—the body portion 46 of the snap ring 42 may be diametrically constricted so as to be received within the retention groove 43 to a sufficient extent that the coupler portion 35 may be readily inserted into the coupling chamber 33. When the coupler portion 35 has thus been fully inserted into the coupling chamber 33, one may release the constricting pressure applied to the end tabs 45 and the spring-like body portion 46 of the snap ring will expand to engage not only the retention groove 43 but also the locking groove 44, thus locking the coupler portion 35 within the coupler chamber 33 of the receptacle 30.

Figure 3:
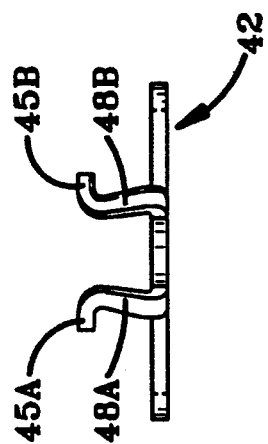
FIG. 3 is a side elevation, taken substantially along line 3—3 of FIG. 2 of the aforesaid locking arrangement.

As seen from a comparison of FIGS. 1 through 3, the end tabs 45A and 45B are disposed radially outwardly from the body portion 46 of the snap ring 42 by extension arms 48A and 48B, respectively. The extension arms 48 are received within an axially disposed, preferably tapered, slot 49 provided in the transmission case 17 and extend radially outwardly from the mouth portion 36 not only to provide manual access to the end tabs 45 but also to allow the coupler portion 35 to be insertably received within the coupling chamber 33 with minimal interference.

As previewed without explanation in the previous paragraphs, and as will appear in the detailed description which follows, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are two extension arms that are generally identified by the numeral 48, but the specific individual extension arms are, therefore, identified as 48A and 48B in the specification and on the drawings. This same suffix convention shall be employed throughout the specification.

In the exemplary embodiment of the envelope 10 depicted in FIG. 1, the housing 50 thereof is depicted as being comprised of a base portion 51, a cap portion 52 and the heretofore described coupler portion 35. The base portion 51 is provided with a central aperture 53 that frictionally engages the outer periphery of a mounting boss 54 which extends axially from the coupler portion 35. The connection therebetween may be enhanced by staking the boss 54 to that portion of the base 51 which defines the central aperture 53.

The cap portion 52 of the envelope housing 50 may be provided with a radially extending rim 55 that extends circumferentially of the cap portion 52 and is mechanically engaged by the folded edge 56 of the base portion 51 in a typical sheet metal seam 57. The joinder of the base portion 51 to the coupler portion 35, as well as the joinder of the cap portion 52 to the base portion 51, both provide a hermetical seal to preclude uncontrolled communication between the interior of the envelope housing 50 and the exterior environment to which the envelope 10 may be exposed.

The circumferential outer wall 58 of the cap portion 52 defines an interior cylinder 59 within which an actuating piston 60 reciprocates. The piston 60 has a central hub portion 61 that is penetrated by an axial bore 62 within which the servo-apply pin 22 is received. A pair of axially spaced annular grooves 63A and 63B are provided on the servo-apply pin 22 in order to receive retaining rings 64A and 64B, respectively. Retaining ring 64A engages the first end wall 65 on the hub portion 61, and retaining ring 64B engages the second end wall 66 on the hub portion 61. With the hub portion 61 of the actuating piston 60 thus embraced between the retaining rings 64, the piston 60 is anchored in axially fixed relation with respect to the servo-apply pin 22 so that as the actuating piston 60 is moved axially within the cylinder 59 the servo-apply pin 22 translates axially with the piston 60.

The radially outer periphery of the piston 60 may be provided with a circumferential recess 68 within which an annular wiping seal 69 is received. The wiping seal 69 is thus interposed between the actuating piston 60 and the cylinder 59 to maintain the integrity of piston chamber 70 as the piston 60 reciprocates within the cylinder 59.

A compression spring 71 is preferably interposed between the actuating piston 60 and the base portion 51 of the envelope housing 50. Specifically, a portion the spring 71 may circumscribe the hub portion 61 of the piston 60. By thus circumscribing the hub portion 61, the spring 71 tends to remain disposed concentrically of the servo-apply pin 22. With the spring 71 so disposed, end 74 of the spring 71 engages the base portion 51 of the envelope housing 50 in proximity to the connection of the base portion 51 to the coupler portion 35 in order to bias the piston 60 and thereby retract the servo-apply pin 22.

A passage 75, which opens into the piston chamber 70 through end 82 of the servo-apply pin 22, extends axially within the servo-apply pin 22 to assist in effecting communication between the piston chamber 70 and a conduit 76 which provides or drains the pressurized fluid to operate the servo mechanism 21 contained within the envelope 10. As is also best seen from FIG. 1, the conduit 76 opens into the pilot bore 31. A manifold recess 78 is provided on the outer surface of the servo-apply pin 22, and a transverse or cross bore 81 effects communication between the manifold recess 78 and the axial passage 75. When appropriately positioned, the manifold recess 78 will maintain uninterrupted communication between the piston chamber 70 and the conduit 76 irrespective of whether the servo-apply pin 22 has been retracted by the action of the compression spring 71 or has been protracted by action of the piston 60.

In order to seal the manifold recess 78, a pair of annular grooves 79A and 79B are spaced axially beyond the opposite ends of the manifold recess 78 to receive O-rings 80A and 80B, respectively. Hence, the presence of pressurized fluid within the conduit 76 is communicated into the piston chamber 70 to effect protraction of the servo-apply pin 22, and thereby actuate the brake band assembly 11 in a manner well known to the art when the force applied by the pressurized fluid within the piston chamber exceeds the force applied by the compression spring 71 to retract the servo-apply pin 22.

Conversely, when the fluid pressure within conduit 76 is reduced to the point that the force applied by spring 71 exceeds the force applied by the fluid pressure within chamber 70 against the piston 60, the chamber 60 may drain into and through the conduit 76 allowing the spring 71 to move the piston 60 to retract the servo-apply pin 22.

It should also be noted that the bore 83, through the coupler portion 35 to receive the servo-apply pin 22, need not be sealed. In that way any fluid which might gain entrance to the cavity 84 in the envelope housing 50 may be continuously evacuated through a relief drain 85 into the plenum cavity 32 within the transmission case 17.

As should now be apparent, a fully operative servo mechanism 21 can be housed within the self-contained envelope 10 for facile assembly, removal and replacement, and at a minimal cost.

Figure 4:
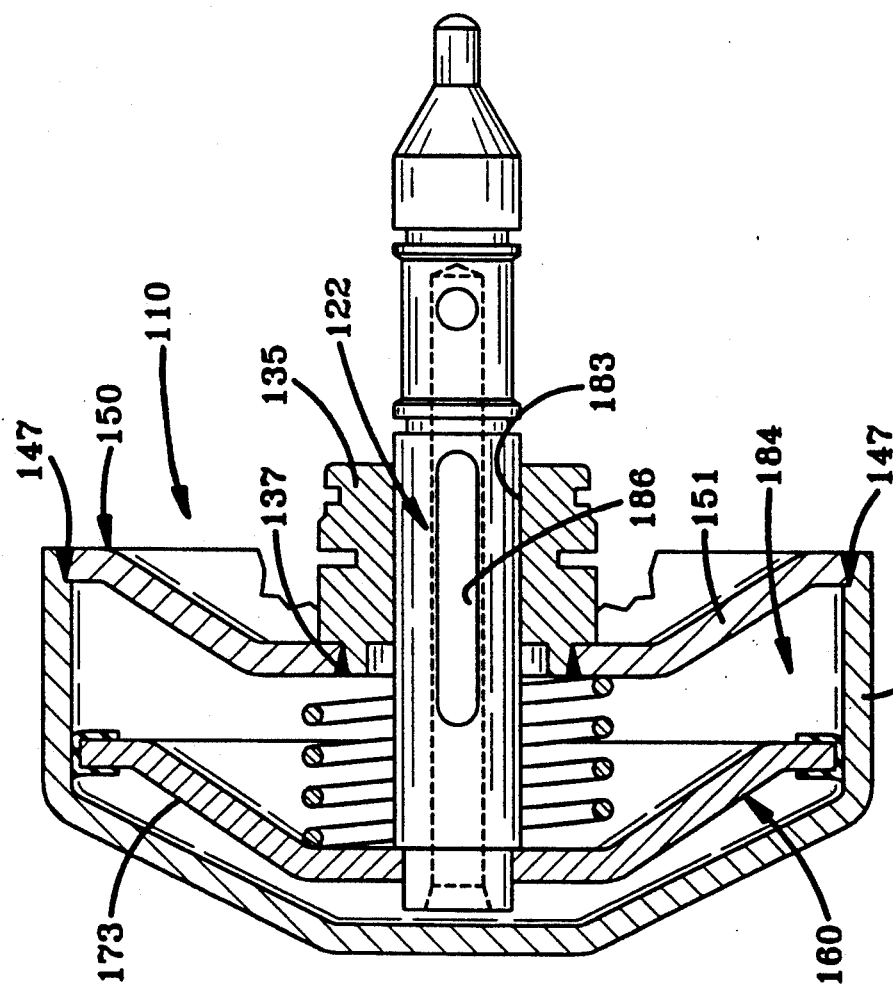
FIG. 4 is a cross-sectional view similar to FIG. 1 and depicting a variation in the construction of the envelope depicted in FIG. 1.

It should also be noted that the envelope may be fabricated from a heavier metal that can be more readily welded than joined by sheet metal seams. An example of such a variation is depicted in FIG. 4, wherein the housing 150 of the envelope 110 comprises base and cap portions 151 and 152 of relatively heavy metal. As such, the base portion 151 can be welded to the coupler portion 135, as at 137, and the cap portion 152 can, in turn, be welded to the base portion 151, as at 147. With a welded construction it would also be convenient to eliminate the hub portion of the piston 160. In that way the web portion 173 can be welded, or press fit, as shown, directly to the servo-apply pin 122.

FIG. 4 also depicts an alternative arrangement that will insure that any fluid within the cavity 184 of the envelope housing 150 can escape between the servo-apply pin 122 and the bore 183 through the coupler portion 135. Specifically, an axially oriented recess 186 may be provided in the exterior surface of the servo-apply pin 122, at least for a length sufficient to provide communication therealong, irrespective whether the servo-apply pin 122 has been retracted or protracted. The remaining structural configuration of this embodiment is virtually identical with the embodiment shown and described in conjunction with envelope 10 and need not, therefore, be repeated.

Figure 5:
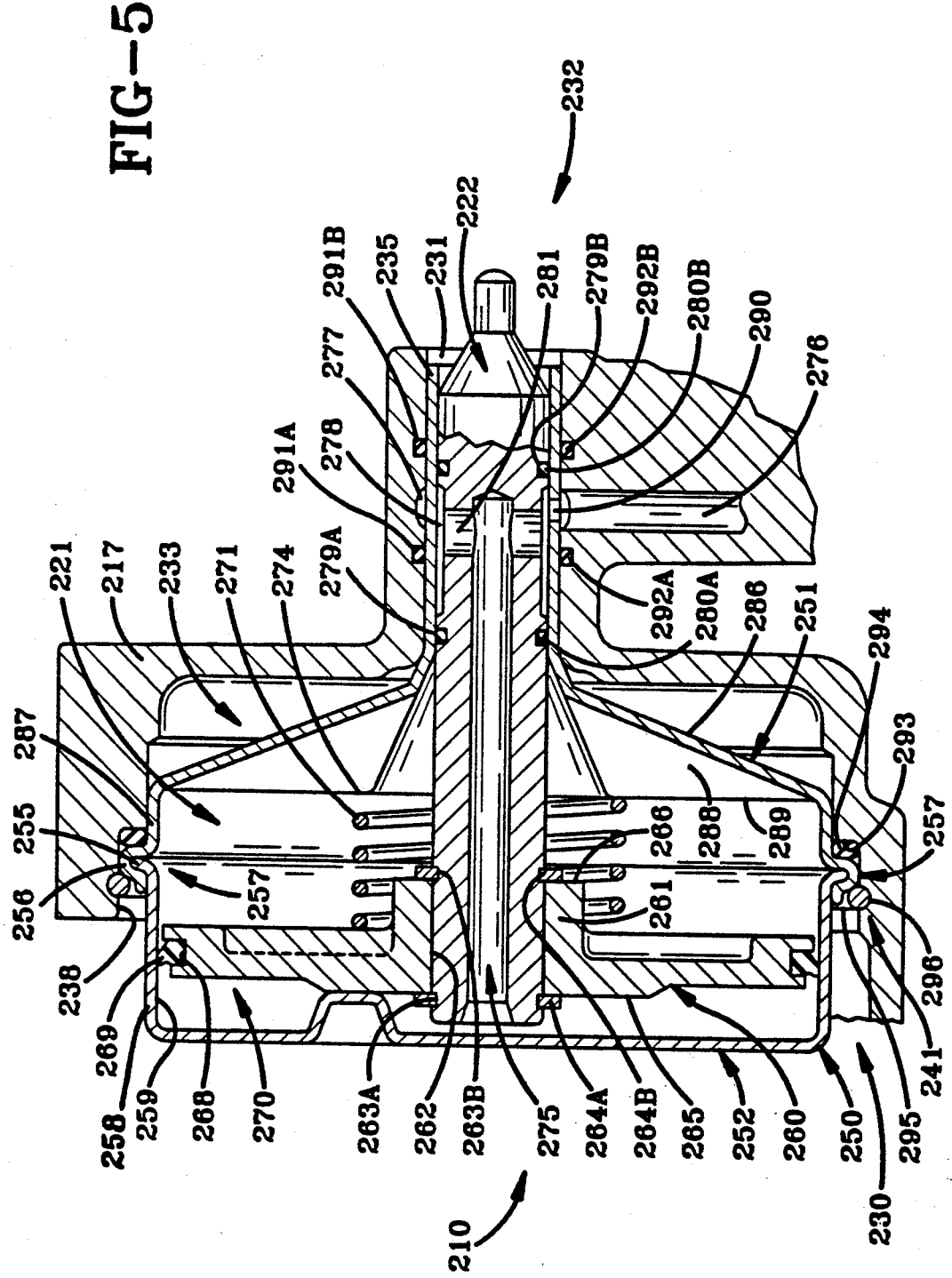
FIG. 5 is a cross-sectional view similar to FIG. 4 but depicting an alternative embodiment for the configuration of the envelope as well as the locking arrangement.

A further variation, by way of an alternative embodiment, is depicted in FIG. 5. In that embodiment a coupler portion 235 has been formed as an integral part of the envelope 210. Accordingly, the envelope 210 may be demountably secured in a receptacle 230 that is formed with the case 217 of a vehicular transmission and need also only be machined to a modest extent. The receptacle 230 includes a pilot bore 231 that is located axially of the receptacle 230. The pilot bore 231 penetrates the transmission case 217 such that one end of the pilot bore 231 opens into the plenum cavity 232 located interiorly of the case 217. The other end of the pilot bore 231 opens into the coupling chamber 233. In this embodiment as well, the pilot bore 231 and the coupling chamber 233, including any structure thereof, constitute the receptacle 230, but in this embodiment, the coupling chamber 233 requires even less machining than receptacle 30 to accommodate the envelope 210.

Turning now to a description of the envelope 210, the housing 250 thereof is comprised of a base portion 251, a cap portion 252 and the coupler portion 235. However, in this embodiment, the base portion 251 and the coupler portion 235 may be unitary. The base portion 251 also includes an inclined section 286 which extends axially and radially outwardly from the coupler portion 235 and which terminates in a preferably annular rim section 287. If desired, a plurality of reinforcing ribs 288 may be included in the transitional section 286 to lend stability to the base portion 251 and also to provide a discontinuous planar reaction surface 289 against which end 274 of the compression spring 271 can be seated, as will be hereinafter more fully described.

The radially outer wall 258 of cap portion 252 terminates in a radially extending rim 255 that circumscribes the cap portion 252 and is mechanically engaged by the folded edge 256 presented from the radially outer wall 287 of the base portion 251 in a typical sheet metal seam 257. Here, too, the joinder of the cap portion 251 to the base portion 252 provides a hermetical seal to preclude uncontrolled communication between the interior of the envelope housing 250 and the exterior environment to which the envelope 210 may be exposed.

The interior of the circumferential outer wall 258 of the cap portion 252 defines a cylinder 259 within which an actuating piston 260 reciprocates. The piston 260 has a central hub portion 261 that is penetrated by an axial bore 262 within which the servo-apply pin 222 is received. A pair of axially spaced annular grooves 263A and 263B are provided on the servo-apply pin 222 in order to receive retaining rings 264A and 264B, respectively. Here, too, the retaining ring 264A engages the first end wall 265 on the hub portion 261, and retaining ring 264B engages the second end wall 266 on the hub portion 261. With the hub portion 261 of the actuating piston 260 thus embraced between the retaining rings 264A and 264B, the piston 260 and servo-apply pin 222 are anchored in axially fixed relation with respect to each other so that as the actuating piston 260 is moved axially within the cylinder 259 the servo-apply pin 222 translates axially with the piston 260.

The radially outer periphery of the piston 260 may be provided with a circumferential recess 268 within which an annular wiping seal 269 is received. The wiping seal 269 is thus interposed between the actuating piston 260 and the cylinder 259 to maintain the integrity of the piston chamber 270 as the piston 260 reciprocates within the cylinder 259.

A compression spring 271 is preferably interposed between the actuating piston 260 and the base portion 251 of the envelope housing 250. Specifically, one end portion of the spring 271 may circumscribe the hub portion 261 of the piston 260. By thus circumscribing the hub portion 261, the spring 271 tends to remain disposed concentrically of the servo-apply pin 222. With the spring 271 thus disposed with respect to the cap portion 251, end 274 of the spring 271 engages the reaction surface 289 presented from the reinforcing ribs 288 incorporated in the transitional section 286 of the base portion 251 in order to bias the piston 260 and thereby retract the servo-apply pin 222.

A passage 275 extends axially within the servo-apply pin 222 and communicates with a cross bore 281 to assist in effecting communication between the piston chamber 270 and the conduit 276 which provides or drains the pressurized fluid to operate the servo mechanism 221 contained within the envelope 210. The conduit 276 opens into the pilot bore 231 through an annular recess 277 in the wall of the pilot bore 231. An annular manifold recess 278 is provided on the surface of the servo-apply pin 222. The manifold recess 278 remains in constant communication with the first recess 277 by virtue of a bore 290 which penetrates the coupler portion 235 of the envelope 210 in order to permit hydraulic fluid to flow freely between the passage 275 and the conduit 276 irrespective of whether the servo-apply pin 222 has been retracted by the action of the compression spring 271 or has been protracted by action of the piston 260.

In order to seal the manifold recess 278 a pair of annular grooves 279A and 279B—which are spaced axially beyond the opposite ends of the manifold recess 278—are recessed into the outer surface of the servo-apply pin 222 to receive O-rings 280A and 280B, respectively. In order to seal the first recess 277 a pair of annular grooves 291A and 291B—which are spaced axially beyond the opposite sides of the first recess 277—are recessed into the surface of the pilot bore 231 to receive O-rings 292A and 292B, respectively. The coupler portion 235 of the envelope 210 is disposed radially between the servo-apply pin 222 and the pilot bore 231.

A locking means 241 is employed selectively to secure the envelope 210 to the transmission case 217. As depicted in FIG. 5, the case 217 is provided with a shoulder 293 upon which the seam 257 between the base portion 251 and the cap portion 252 may be supported. A compression member 294 may be interposed between the seam 257 and the shoulder 293 to apply a resilient, axial force outwardly against the seam 257. The compression member 294 also acts as a flexible joint between the transmission case 217 and the envelope 210 in order to dampen any shock or vibration therebetween.

The actual retention of envelope 210 on the transmission case 217 may be accomplished by a split retaining ring 295. The split retaining ring 295 is received in a locking recess 296 machined into the interior surface 238 of the coupling chamber 233. When the ring 295 is insertably received within the locking recess 296, it precludes axial movement of the envelope 210, thus locking it in place.

As should now be apparent, the present invention provides a new and novel concept of housing a servo mechanism for a vehicular transmission in a self-contained envelope that not only provides a simplified assembly process by supplying a single unit for insertion into a receptacle in the transmission case but also accomplishes the other objects of the invention.

The embodiments of the invention in which an exclusive property or privilege is claimed are defined as follows:

1. In combination with a vehicular transmission case, a self-contained envelope for housing a servo mechanism for actuating a brake band assembly in the transmission, the combination comprising: a receptacle provided in the transmission case; said receptacle having a pilot bore that penetrates the transmission case and a coupling chamber that is located axially of said pilot bore; the envelope having base, cap and coupler portions; a servo-apply pin extending outwardly through said coupler portion of the envelope to be reciprocatingly received within said pilot bore; a piston chamber defined by the interior of said base and cap portions; an actuating piston operatively received in said piston chamber; said actuating piston being secured to said servo-apply pin; means to effect communication of hydraulic pressure from a conduit within the transmission case, through said coupler portion and said servo-apply pin into said piston chamber; locking means selectively to secure the envelope within said receptacle; a passage extending axially of said servo-apply pin and opening into said piston chamber; a cross bore in said servo-apply pin communicating with said passage and an annular manifold recessed into the exterior of said servo-apply pin; an annular recess in said pilot bore communicating with said conduit; said coupler portion being interposed between said servo-apply pin and said coupling chamber; and, a bore penetrating said coupler portion to effect communication between said manifold recess and said annular recess.

2. An envelope having a servo mechanism for the brake band assembly of a vehicular transmission, the envelope comprising: a cap portion, a base portion and a coupler portion; pilot bore means in a transmission case supporting said envelope; said cap, base and coupler portions being conjoined; a servo-apply pin received for axial reciprocation within said coupler portion; a cylinder provided within said conjoined cap and base portions to receive a piston for axial reciprocation; said piston being secured to said servo-apply pin so that reciprocation of one effects reciprocation of the other; means to engage a locking mechanism formed on one of said coupler portion and said cap and base portions and presented from said envelope; and a radially extending seam by which said cap and base portions are securely conjoined by mechanical interlocking of only the cap and base portions.

* * * * *